(12) United States Patent
Axelsson et al.

(10) Patent No.: US 9,795,110 B2
(45) Date of Patent: Oct. 24, 2017

(54) CAMERA CLEANING SYSTEM AND METHOD AND ROTARY MILKING SYSTEM

(71) Applicant: DELAVAL HOLDING AB, Tumba (SE)

(72) Inventors: Thomas Axelsson, Farsta (SE); Jan Eriksson, Uttran (SE); Mats Nilsson, Uttran (SE)

(73) Assignee: DELAVAL HOLDING AB, Tumba (SE)

( * ) Notice: Subject to any disclaimer, the term of this patent is extended or adjusted under 35 U.S.C. 154(b) by 721 days.

(21) Appl. No.: 14/362,137

(22) PCT Filed: Nov. 29, 2012

(86) PCT No.: PCT/SE2012/051326
§ 371 (c)(1),
(2) Date: Jun. 2, 2014

(87) PCT Pub. No.: WO2013/081544
PCT Pub. Date: Jun. 6, 2013

(65) Prior Publication Data
US 2014/0318581 A1    Oct. 30, 2014

Related U.S. Application Data

(60) Provisional application No. 61/566,092, filed on Dec. 2, 2011.

(30) Foreign Application Priority Data

Dec. 2, 2011   (SE) ...................................... 1151149

(51) Int. Cl.
  *A01J 7/02*    (2006.01)
  *A01K 1/12*    (2006.01)

(52) U.S. Cl.
  CPC ................. *A01J 7/02* (2013.01); *A01K 1/126* (2013.01)

(58) Field of Classification Search
None
See application file for complete search history.

(56) References Cited

U.S. PATENT DOCUMENTS

| 5,784,994 A | 7/1998 | van der Lely |
| 5,879,626 A | 3/1999 | Watterson et al. |

(Continued)

FOREIGN PATENT DOCUMENTS

| EA | 200970802 A1 | 12/2009 |
| EP | 0 688 498 A2 | 12/1995 |

(Continued)

OTHER PUBLICATIONS

English Machine Translation of EP 1352559.*

(Continued)

*Primary Examiner* — Nicole Blan
(74) *Attorney, Agent, or Firm* — Young & Thompson

(57) ABSTRACT

A camera cleaning system and method for a milking system which includes a rotating platform, plural milking stalls thereon, a robot for performing an animal related operation with respect to the animals in the milking stalls passing by the robot, and a camera in response to signals from which the robot moves, the camera cleaning system includes usage identifying arrangement to identify a future usage demand of the camera; a processing device to analyze the future usage demand of the camera to find at least one time slot when the camera is not to be used and which also occurs during certain conditions; and a cleaning arrangement arranged to clean the lens arrangement of the camera during the determined time slot.

20 Claims, 1 Drawing Sheet

(56) References Cited

U.S. PATENT DOCUMENTS

| | | |
|---|---|---|
| 8,074,600 B2 | 12/2011 | Kallen et al. |
| 2002/0152962 A1 | 10/2002 | Fransen |
| 2005/0076840 A1* | 4/2005 | Van Den Berg ........ A01J 5/017 119/14.04 |
| 2008/0092822 A1* | 4/2008 | Sjoblom .................. A01J 7/02 119/14.08 |
| 2009/0129628 A1* | 5/2009 | Mirbach .................. G06T 7/73 382/103 |
| 2010/0186675 A1* | 7/2010 | Van Den Berg ...... A01J 5/0175 119/14.03 |
| 2010/0289649 A1* | 11/2010 | Holmgren ............ A01J 5/0175 340/573.3 |

FOREIGN PATENT DOCUMENTS

| | | |
|---|---|---|
| EP | 1 352 559 A2 | 10/2003 |
| EP | 1 913 811 A2 | 9/2007 |
| RU | 1777728 A1 | 11/1992 |
| SU | 1509008 A1 | 9/1989 |
| WO | 00/51417 A1 | 9/2000 |
| WO | 2010/031632 A1 | 3/2010 |
| WO | 2011/000774 A2 | 1/2011 |
| WO | 2011/098454 A1 | 8/2011 |

OTHER PUBLICATIONS

International-Type Search Report, dated Jul. 5, 2012, from corresponding PCT application.
International Search Report, dated May 8, 2013, from corresponding PCT application.
Supplementary International Search Report, dated Nov. 28, 2013, from corresponding PCT application.

* cited by examiner

CAMERA CLEANING SYSTEM AND METHOD AND ROTARY MILKING SYSTEM

TECHNICAL FIELD OF THE INVENTION

The present invention generally relates to dairy farming and more specifically to camera cleaning systems and methods in a milking system as well as to a rotary milking system comprising such camera cleaning system.

DESCRIPTION OF RELATED ART AND BACKGROUND OF THE INVENTION

Rotary milking systems, which comprise each a rotating platform, a plurality of milking stalls arranged thereon for housing a plurality of animals during milking thereof, at least one robot for performing an animal related operation with respect to animals in milking stalls passing by the robot, and a camera in response to signals from which the robot is configured to move, are becoming more and more common. In such milking systems, the robot can e.g. be arranged to attach teat cups to the teats of the animals in the milking stalls prior to milking as the animals pass by the robot. Other robots may be provided for pre-treating, cleaning and/or foremilking the teats of the animals in the milking stalls prior to milking, and for post-treating the teats of the animals in the milking stalls subsequent to milking.

Each such robot is provided with its dedicated camera typically mounted on a robot arm of the robot. Since the robot arm operates in an environment with animals, the lens arrangement of the camera may become dirty rather frequently, and as result the visibility of the camera is deteriorated and the movement of the robot will be more difficult to control.

SUMMARY OF THE INVENTION

Since a robot is much more frequently used in a rotary milking system, particularly a rotary milking system with a large number of milking stalls, than in a so called milking robot wherein a robot serves only one or two milking stalls, it may be difficult to have time to clean the lens arrangement of the camera when required. It is normally not an option to halt the entire milking system including the rotating platform in order to have time to properly clean the lens arrangement of the camera.

Accordingly, it is an object of the present invention to provide a camera cleaning system and a method by which the limitation associated with the prior art as set forward above is avoided.

It is a further object of the invention to provide such camera cleaning system and method which are simple, robust, effective, fast, precise, accurate, reliable, safe, easy to use, and of low cost.

These objects among others are, according to the present invention, attained by systems and methods as claimed in the appended patent claims.

According to one aspect of the invention, there is provided a camera cleaning system for a milking system, e.g. a rotary milking system, which milking system comprises a moving arrangement, e.g. a rotating platform, a plurality of milking stalls arranged thereon for housing a plurality of animals during milking thereof, a robot for performing animal related operations with respect to the animals in the milking stalls passing by the robot, and a camera in response to signals from which the robot is configured to move, wherein the camera cleaning system comprises a usage identifying arrangement, arranged to identify a future usage demand of the camera, a processor arranged to analyse the identified future usage demand of the camera to find at least one time slot wherein the camera is not to be used and which occurs (i) when an empty milking stall, or a milking stall housing an animal which is not to be milked, or is not being milked, passes by the robot during movement of the moving arrangement, or (ii) when an unplanned stoppage of the milking system occurs, and a cleaning arrangement, arranged to clean the lens arrangement of the camera during the found time slot. By the term lens arrangement is here meant the lens and/or any filter (colour, UV, neutral density, etc.) or any other optical component, such as e.g. a light transparent protection glass, mounted in front of the lens. It is the outer surface of such arrangement which may become dirty and which thus may be cleaned in accordance with the above aspect of the invention.

The term future usage demand relates to the demand for usage in milking at some time window in the future, e.g. starting at a time instant coinciding with the time of identification of the future usage demand. The future usage demand may be repeatedly or continuously updated depending on various parameters related to the milking system and the milking, such as e.g. when it is detected that a milking stall remains empty without any animal entering it, when it is detected that an animal which is not to be milked has entered a milking stall, when it is detected that an animal is not being milked in a milking stall, or when an unplanned stoppage of the milking system is detected. In the latter instance, the future usage demand of the camera is instantly updated to state that the camera is not going to be used for milking during some time in the immediate future. This time may be different for different kinds of detected stoppages.

Preferably, the at least one time slot is a plurality of time slots, wherein the time slots at which the camera is not used have an occurrence or occur at a rate which is lower than the frequency at which the milking stalls pass by the robot.

Yet preferably, each time slot is longer than any time slot, during which the camera is not to be used and which normally occurs between the animal related operations with respect to animals in each two adjacent milking stalls, and preferably even longer than a time required for the cleaning arrangement to clean the lens arrangement of the camera.

By such a system the lens arrangement can be kept clean without halting the entire milking system including the rotating platform (or the linearly or otherwise moving arrangement, platform, structure, band, vehicle, or the like, on which the milking stalls are arranged) for the sole purpose of cleaning the lens arrangement of the camera. The reliability and usefulness of the robot is increased, and as a result the utilization of the milking system and also the milk production can be held at a high level. While reference is made below to a rotary milking system with a rotating platform, it shall be appreciated by a person skilled in the art that the various embodiments and features of the invention may be applicable in other kind of milking systems having a linear or otherwise moving arrangement, platform, structure, band, vehicle, or the like, on which the milking stalls are arranged.

In one embodiment, each time slot at which the camera is not used is a time slot occurring when an empty milking stall, or a milking stall housing an animal which is not to be milked, or is not being milked, during a revolution of the rotating platform, passes by the robot during that revolution of the rotating platform. The usage identifying arrangement may include a detecting arrangement comprising (i) the camera, arranged to detect whether a milking stall is empty or whether an animal in a milking stall is not being milked, and/or (ii) a dedicated sensor, arranged to detect whether a milking stall is empty, and/or (iii) an animal identification device, arranged to detect whether a milking stall is empty or whether a milking stall houses an animal which is identified as not being permitted to be milked, and is thus not to be milked, and/or, (iv) for each of the milking stalls, a vacuum sensor or milk flow sensor arranged to sense the vacuum or the milk flow in a milking stall, to thereby detect whether that milking stall is empty or whether an animal in that milking stall is not being milked. In a rotary milking system the scenario with an empty milking stall or an animal not being milked in a milking stall occurs every now and then and thus there will always be found time slots when the camera is not used and when the lens arrangement of the camera can therefore be cleaned also during normal operation of the rotary milking system.

In a further embodiment, each time slot at which the camera is not used is a time slot occurring when an unplanned stoppage of the rotary milking system occurs, and the usage identifying arrangement is arranged to identify unplanned stoppages of the rotary milking system by means of detecting such stoppage when it occurs. Hereby, the lens arrangement of the camera can be cleaned at an unplanned stoppage of the rotary milking system e.g. caused by a failure, or at an unplanned stoppage caused by an animal standing in the way of a moving part of the rotary milking system. Preferably, the usage identifying arrangement is arranged to identify when the operation of the rotary milking system is resumed, and the cleaning arrangement may be arranged to interrupt the cleaning of the lens arrangement of the camera when the operation of the rotary milking system is identified as being resumed. Hereby, the cleaning of the lens arrangement of the camera can be shortened such that it does not delay the operation of the rotary milking system.

The usage identifying arrangement may include (i) a detecting arrangement, comprising the camera arranged to detect unplanned stoppages of the rotary milking system, e.g. by means of detecting when the rotating platform is stopped, and/or a dedicated sensor, arranged to detect unplanned stoppages of the rotary milking system, e.g. by means of detecting when the rotating platform is stopped, and/or (ii) a receiving arrangement, arranged to receive indications that unplanned stoppages of the rotary milking system have occurred, e.g. from the central processing and control device or a herd management system of the rotary milking system.

In yet a further embodiment, the camera is provided with dirt sensing means for repeatedly detecting the uncleanliness of the lens arrangement of the camera, wherein the cleaning arrangement is arranged to clean the lens arrangement of the camera depending also on the repeatedly detected uncleanliness. Hereby, the lens arrangement of the camera may be cleaned while the milking stall which has been detected as empty or housing an animal detected as not to be, or not being, milked during the revolution of the rotating platform, passes by the robot during the revolution of the rotating platform only if the dirt sensing means indicates that the lens arrangement is unclean.

According to a further aspect of the invention, there is provided a camera cleaning method for a milking system, preferably a rotary milking system, which milking system comprises a moving arrangement, preferably a rotating platform, a plurality of milking stalls arranged thereon for housing a plurality of animals during milking thereof, a robot for performing an animal related operation with respect to the animals in the milking stalls passing by the robot, and a camera in response to signals from which the robot is configured to move. According to the method a future usage demand of the camera is identified, the identified future usage demand of the camera is analysed to find at least one time slot wherein the camera is not to be used, and which occurs (i) when an empty milking stall, or a milking stall housing an animal which is not to be milked, or is not being milked, passes by the robot during movement of the moving arrangement, or (ii) when an unplanned stoppage of the milking system occurs, and the lens arrangement of the camera is cleaned during the found time slot.

It is a further object of the invention to provide a rotary milking system equipped with a camera cleaning system that fulfils the above objects.

This object is accomplished by a rotary milking system comprising a rotating platform, a plurality of milking stalls arranged thereon for housing a plurality of animals during milking thereof, a robot for performing an animal related operation with respect to animals in milking stalls passing by the robot, a camera in response to signals from which the robot is configured to move, and the camera cleaning system of the above disclosed aspect of the invention. Preferably, the camera is arranged on an arm of the robot.

In one embodiment, the cleaning arrangement, e.g. in form of a cleaning station, is arranged remote from the camera and the robot is provided to move the camera to the cleaning arrangement when the cleaning arrangement is to clean the lens arrangement of the camera. Alternatively, the cleaning arrangement is movable and is provided to be moved to the camera when the cleaning arrangement is to clean the lens arrangement of the camera. Further, even if the robot is provided to move the camera to the cleaning arrangement, the cleaning arrangement may also need to be moved to an active position, closer to the robot than its idle position.

In another embodiment, the cleaning arrangement is, at the above-indicated occasions, arranged to clean the lens arrangement of the camera according to a first cleaning scheme, which is thorough and may involve the use of detergents, and/or solvents, and/or acids, and/or alkali, and/or mechanical cleaning means such as a sponge or a brush. The rotary milking system comprises a rinsing arrangement, preferably fixedly arranged on the arm of the robot and arranged to clean the lens arrangement of the camera according to a second cleaning scheme between the animal related operations with respect to the animals in each two adjacent milking stalls. The second cleaning scheme is simple and may involve only the flushing of the lens arrangement with water followed by blowing of air to dry the lens arrangement. In any case the cleaning according to the second cleaning scheme is less time consuming and/or less complex than the cleaning according to the first cleaning scheme. Hereby, a simple cleaning may be performed after, in principle, each animal related operation with respect to an animal whereas a more advanced cleaning is performed more rarely, i.e. when the milking stall which has been detected as empty or housing an animal detected as not to be, or not being, milked, passes by the robot during the revolution of the rotating platform.

The robot can be arranged to pre-treat, and/or clean, and/or foremilk the teats of the animals in the milking stalls prior to milking, to attach teat cups to the teats of the animals in the milking stalls prior to milking, and/or to post-treat the teats of the animals in the milking stalls subsequent to milking. Alternatively, a plurality of robots are provided in the rotary milking system, e.g. for all or some of the above purposes. To this end, a plurality of cameras can be provided, each equipped with a camera cleaning system as disclosed above for cleaning the camera lens arrangement.

In particular, if a plurality of robots, cameras and inventive camera cleaning systems are provided, one or more camera cleaning systems may share a common cleaning arrangement, e.g. in form of a cleaning station, and one or more robots may be arranged to move the camera having such a camera cleaning system to the common cleaning arrangement when the common cleaning arrangement is to clean the lens arrangement of the camera.

Further characteristics of the invention, and advantages thereof, will be evident from the following detailed description of preferred embodiments of the present invention given hereinafter and the accompanying FIGS. 1-2, which are given by way of illustration only, and are thus not limitative of the present invention.

DETAILED DESCRIPTION OF EMBODIMENTS

Figure 1:
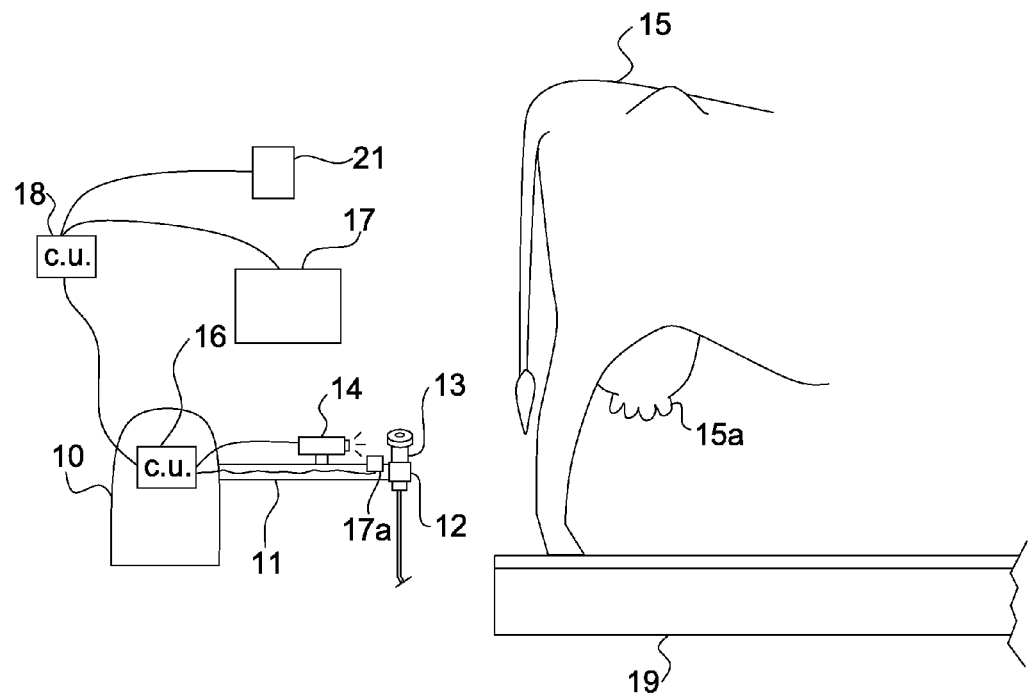
FIG. 1 displays schematically, in side view, parts of a rotary milking system in which a camera cleaning system according to an embodiment of the invention is implemented.
Figure 2:
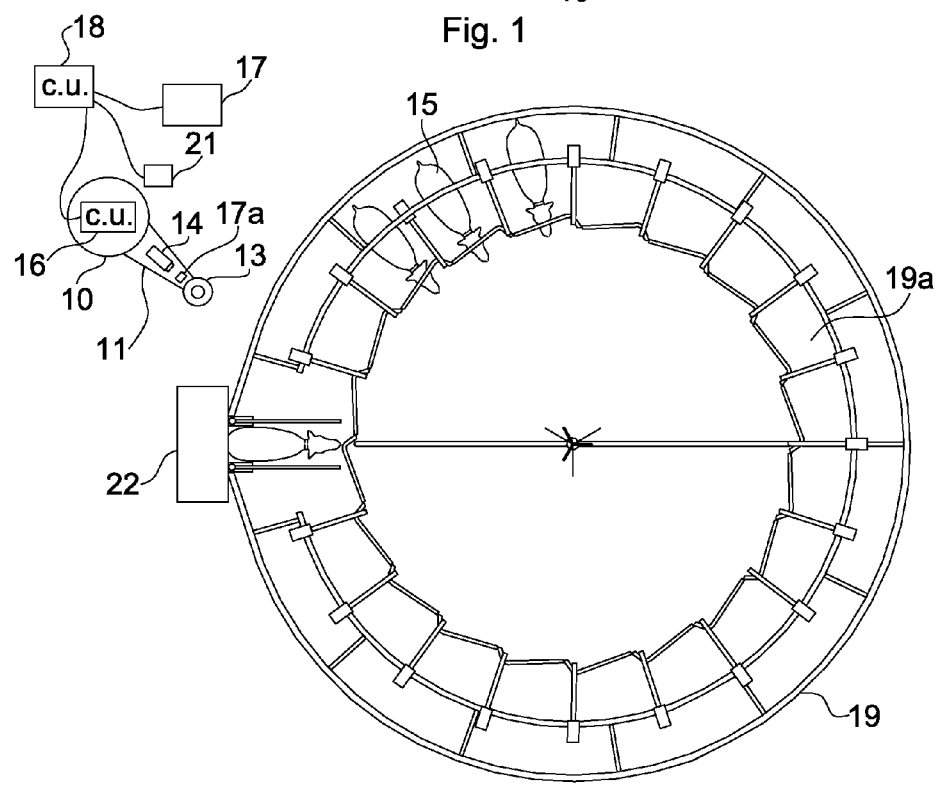
FIG. 2 displays schematically, in top view, the rotary milking system with the camera cleaning system of FIG. 1.

The rotary milking system of FIGS. 1-2 comprises a rotating platform 19 including a plurality of milking stalls 19a arranged along the circumference thereof, each configured to house an animal 15 e.g. with the head facing inwards during milking thereof. The animals 15 enter and leave the rotating platform 19 preferably in a sequential manner, and each milking stall 19a comprises equipment for milking the animal 15 in the milking stall 19a. Such equipment comprises teat cups to be attached to the teats 15a of the animal 15 prior to milking. In FIG. 1 one such teat cup 13 is illustrated.

The rotary milking system comprises further a robot 10 having a robot arm 11, a gripper 12 for gripping at least one teat cup 13 at a time, a camera 14 preferably mounted on the robot arm 11, and a control device 16 for control of the robot 10 and its parts. The gripper 12 is conveniently located at the end portion of the robot arm 11, and the camera 14 is attached to the robot arm 11 at a distance behind the gripper 12. The camera 14 may be any kind of image recording device in the art such as e.g. a CCD camera or a time-of-flight camera and provides image data to the control device 16, in response to which the control device 16 may control the robot arm 11.

The rotary milking system comprises further an animal identification device 22 which the animals 15 have to pass when entering the rotating platform 19. By such device 22 each animal 15 can be identified and linked to the milking stall 19a housing the animal 15. Other kind of identification arrangements may alternatively be provided which identify the animal 15 in each milking stall 19a.

The robot 10 is arranged to attach teat cups 13 to the teats 15a of the animals 15 which have entered the rotating platform 19 for milking. Milking is performed of an animal 15 during one full revolution of the rotating platform 19, after which the animal 15 is allowed to leave the rotating platform 19.

Each milking stall 19a is provided with connections that connect the teat cups 13 thereof to vacuum, and each milking stall 19a may be equipped with a vacuum sensor (not illustrated) that senses the vacuum in the teat cups 13 or somewhere else in the portions of the milking equipment of the milking stall 19a which is connected to vacuum, and a milk flow sensor (neither illustrated) that senses the milk flow during milking in order to record the amounts of milk produced by each animal 15.

The rotary milking system may further be provided with a central processing and control device (not illustrated) for the overall control of the rotary milking system as well as a herd management system (neither illustrated) for overall management planning and processing.

Furthermore, a camera cleaning system according to one embodiment of the invention is implemented in the rotary milking system of FIGS. 1-2. The camera cleaning system comprises a detector arrangement arranged to detect whether a milking stall 19a is empty or whether an animal 15 in a milking stall 19a is not to be milked during a revolution of the rotating platform 19, and a cleaning arrangement 17 arranged to clean the lens arrangement of the camera 14 while the milking stall 19a, which has been detected as empty or housing an animal 15 detected as not to be milked during the revolution of the rotating platform 19, passes by the robot 10 during that revolution of the rotating platform 19. The detector arrangement and the cleaning arrangement 17 are typically operatively connected to a controller 18 for receiving data from the detector arrangement and for controlling the cleaning arrangement 17 in response thereto. The controller 18 may be integrated into the cleaning arrangement 17, into the control device 16 of the robot 10, or into the central processing and control device, or it may be a stand alone microcomputer.

Various devices for detecting whether a milking stall 19a is empty or whether an animal 15 in a milking stall 19a is not to be milked during a revolution of the rotating platform 19 may include the camera 14, and/or the animal identification device 22, and/or a dedicated sensor 21 provided for the sole purpose of this detection.

The camera 14 can be arranged to detect if a milking stall 19a is empty. The animal identification device 22 can be arranged to detect if a milking stall 19a is empty or if a milking stall 19a houses an animal 15 which is identified as not being permitted to be milked, and is thus not to be milked, by referring to the central processing and control device. The dedicated sensor 21, which may be an optical sensor, can be arranged to detect if a milking stall 19a is empty.

By this aspect of the invention, the lens arrangement of the camera 14 can be cleaned when the camera 14 is not used for a certain amount of time due to the fact that teat cups 13 are, for the above detected milking stall 19a, not to be attached since there is no animal 15 in the milking stall 19a, or there is an animal 15 in the milking stall 19a but the animal 15 is not to be milked and therefore no teat cups 13 should be attached. If the cleaning is made shorter than the time spent for attaching teat cups 13 to the teats 15a of an animal 15, no time whatsoever is lost due to the performed cleaning of the camera lens arrangement. The cleaning may be performed in any manner available including use of water, detergent, solvent, acid, alkali, air, etc. and/or mechanical means in the form of e.g. a brush or a sponge. In one embodiment, the cleaning arrangement 17 is arranged remote from the camera 14, in the form of a cleaning station, wherein the robot 10 is provided to move the camera 14 to the cleaning station 17 when the cleaning station 17 is to clean the lens arrangement of the camera 14. Alternatively, the cleaning arrangement 17 is movable and is provided to be moved to the camera 14 when the cleaning arrangement 17 is to clean the lens arrangement of the camera 14. Even if the robot 10 is provided to move the camera 14 to the cleaning arrangement 17, the cleaning arrangement 17 may also need to be moved, because it may not be possible to position it so that it does not interfere with the movement of the robot 10.

While the invention disclosed above has been described with reference to a robot 10 arranged to attach teat cups 13 to the teats 15a of an animal 15, it is equally applicable to cameras used with other kind of robots of a rotary milking system. For instance, the robot 10 may be exchanged for a robot arranged to pre-treat, and/or clean, and/or foremilk the teats 15a of the animals 15 in the milking stalls 19a prior to milking. Such robot will comprise a similar camera and will also operate with respect to the animals 15/milking stalls 19a in a sequential order, and thus an inventive camera cleaning system as disclosed above may be provided also for this robot/camera combination.

Yet further, the robot 10 arranged to attach teat cups 13 to the teats 15a of an animal 15 may be exchanged for a robot arranged to post-treat the teats 15a of the animals 15 in the milking stalls 19a subsequent to milking. Such robot will comprise a similar camera and will also operate with respect to the animals 15/milking stalls 19a in a sequential order, and thus an inventive camera cleaning system as disclosed above may be provided also for this robot/camera combination. In this case it is sufficient to detect if an animal 15 in a milking stall 19a is not being milked during a revolution of the rotating platform 19. This means that in addition to the above detecting devices, also the vacuum sensor in each milking stall 19a or the milk flow sensor of each milking stall 19a can be arranged to sense the vacuum or the milk flow in that milking stall 19a, to thereby detect if that milking stall 19a is empty or if an animal 15 in that milking stall 19 is not being milked. Alternatively, the dedicated sensor 21 can be arranged to detect if a milking stall 19a houses an animal 15 which is identified as not being milked, e.g. by detecting whether the teat cups 13 are attached to the teats 15a of the animal 15 or not. If the robot 10 is a stand-alone robot, which is not connected to the central processing and control device, only the camera 14 or the dedicated sensor 21 can be used to detect if a milking stall 19a is empty or houses an animal 15 which is identified as not being milked, since no information from the animal identification device 22 or the vacuum or milk flow sensors is then available to the robot 10. The cleaning arrangement 17 is then arranged to clean the lens arrangement of the camera while the milking stall 19a, which has been detected as empty or housing an animal 15 detected as not being milked during the revolution of the rotating platform 19, passes by the robot 10 during that revolution of the rotating platform 19.

Still further, a rotary milking system may comprise more than one of the above disclosed robot/camera combinations and thus more than one of the above disclosed inventive camera cleaning systems.

Of course, the lens arrangement of a camera 14 may not have to be cleaned if it is not dirty. To this end, in one embodiment, the camera cleaning system comprises dirt sensing means (not illustrated) for repeatedly determining the uncleanliness of the lens arrangement of the camera 14 and wherein the cleaning arrangement 17 is arranged to clean the lens arrangement of the camera at the above identified occasions only provided that the repeatedly determined uncleanliness indicates that the camera lens arrangement is dirty and has to be cleaned.

While the cameras 14 described above have all been disclosed as being mounted on a respective robot arm 11 of a robot 10, the invention is not limited in this respect. It shall be appreciated by a person skilled in the art that inventive camera cleaning systems of the above kind may be used together with camera/robot combinations wherein the camera is not mounted on the robot arm. It may for instance be mounted elsewhere on the robot, or arranged remotely from the robot, e.g. at a fixed location.

It shall further be appreciated that the above disclosed embodiments may be generalized such that cleaning of the lens arrangement of a camera 14 is not only possible to be performed while the milking stall 19a which has been detected as empty or housing an animal 15 detected as not to be, or not being, milked during the revolution of the rotating platform 19, passes by the robot 10 during that revolution of the rotating platform 19, but also at other occasions when there is time to do so, e.g. due to unplanned stoppages of the milking operation of the rotary milking system.

Thus, according to one version of the invention, there is provided a camera cleaning system for a rotary milking system, which comprises the rotating platform 19, the plurality of milking stalls 19a arranged thereon for housing a plurality of animals 15 during milking thereof, the robot 10 for performing an animal related operation with respect to the animals 15 in the milking stalls 19a passing by the robot 10, and a camera 14, in response to signals from which the robot 10 is configured to move. The camera cleaning system comprises a usage identifying arrangement, arranged to identify a future usage pattern or future usage demand of the camera 10, the controller 18, arranged to analyse the future usage demand of the camera 14 to find at least one time slot wherein the camera 10 is not used and which is longer than any such time slot normally occurring between the animal related operations with respect to animals in each two adjacent milking stalls, and the cleaning arrangement 17, arranged to clean the lens arrangement of the camera during the found time slot. Time slots, at which the camera 14 is not used, are typically coinciding with those time slots, at which the robot 10 is not used. However, if the robot 10 is capable of doing some operation, which e.g. may involve a coarse movement in the beginning of an animal related operation, without the use of the camera 14, the time slots, at which the camera 14 is not used, may be longer and/or occurring more frequently than the time slots, at which the robot 10 is not used.

Preferably, the time slots during which the cleaning arrangement 17 is arranged to clean the lens arrangement of the camera 14 have an occurrence or occur at a rate, which is lower than the frequency at which the milking stalls 19a pass by the robot 10.

Yet preferably, the usage identifying arrangement is at least partly integrated into the controller 18 as e.g. a program module therein.

Still preferably, the time slots are each longer than a time required for the cleaning arrangement 17 to clean the lens arrangement of the camera 14. Hereby, the camera lens arrangement cleaning does not affect the throughput or utilization of the rotary milking system.

The time slots at which the camera 14 is not used are preferably each a time slot occurring when an empty milking stall 19a passes by the robot 10, or a milking stall 19a housing an animal 15 which is not to be milked, or is not being milked, during a revolution of the rotating platform 19, passes by the robot 10 during that revolution of the rotating platform 19, as have been disclosed above.

Alternatively, or additionally, the usage identifying arrangement can be arranged to identify unplanned stoppages of the rotary milking system, e.g. caused by malfunctioning or failure, by means of detecting such stoppages when they occur, wherein the cleaning arrangement 17 is arranged to clean the lens arrangement of the camera 14 when the detected unplanned stoppages occur. To this end, the usage identifying arrangement comprises a detector arrangement, which may be any of the camera 14, arranged to detect an unplanned stoppage of the rotary milking system, e.g. by means of detecting whether the rotating platform is stopped, and a dedicated sensor 21, arranged to detect an unplanned stoppage of the rotary milking system, e.g. by means of detecting whether the rotating platform 19 is stopped. Alternatively, or additionally, the usage identifying arrangement comprises a receiving module (preferably integrated into the controller 18) arranged to receive indications that unplanned stoppages of the rotary milking system have occurred, e.g. from the central processing and control device or the herd management system of the rotary milking system.

Preferably, the usage identifying arrangement is arranged to identify when the operation of the rotary milking system is resumed, and the cleaning arrangement 17 is arranged to interrupt the cleaning of the lens arrangement of the camera 14 when the operation of the rotary milking system is identified as being resumed. Such interruption may include the flushing of the lens arrangement of the camera 14 with water followed by drying the lens arrangement of the camera 14 by blowing air thereon in order to quickly place the camera 14 ready for operation. Typically, the rotary milking system is resumed by starting the rotation of the rotating platform 19, which is typically heavy and as a result the acceleration of the rotary platform takes a certain amount of time, during which the cleaning can be finished. Hereby, the lens arrangement of the camera 14 can be cleaned without affecting/delaying the operation of the rotary milking system.

It shall be appreciated that this version of the invention may be practiced with any of the alternative features, details, and embodiments disclosed above. In particular, the lens arrangement may be cleaned only if being dirty (as detected by the dirt sensing means), the robot may be a robot for attaching teat cups to the teats of the animals in the milking stalls prior to milking, a robot arranged to pre-treat, and/or clean, and/or foremilk the teats of the animals in the milking stalls prior to milking, or a robot arranged to post-treat the teats of the animals in the milking stalls subsequent to milking, and/or the robot/camera combination and the generalized camera cleaning system may be provided in a plurality.

According to a further aspect of the invention, the camera cleaning system comprises a rinsing arrangement 17a fixedly arranged on the arm 11 of the robot 10 and operatively connected to the controller 18, wherein the controller 18 is arranged to control the cleaning arrangement 17 to clean the lens arrangement of the camera 14 according to a first cleaning scheme, and to control the rinsing arrangement 17a to clean the lens arrangement of the camera 14 according to a second cleaning scheme, wherein the cleaning according to the first cleaning scheme is more time consuming than the cleaning according to the second cleaning scheme. In an alternative embodiment the rinsing arrangement is mounted on the camera 14. By such provisions the lens arrangement of the camera 14 can be held clean and clear such that proper operation of the robot is ensured.

The cleaning according to the first cleaning scheme is more complex or thorough and involves the use of use of water, and/or air, and/or detergents, and/or solvents, and/or acids, alkali and/or mechanical cleaning means, such as a viper, and/or brush, and/or or sponge, in a plurality of cleaning steps, whereas cleaning according to the second cleaning scheme is simple and may involve flushing the lens arrangement with a cleaning fluid such as e.g. water followed by blowing air onto the lens arrangement of the camera 14. Hereby, a fast and reliable cleaning (flushing) is performed more often, whereas a more thorough cleaning, preferably comprising mechanical cleaning means contacting the lens arrangement of the camera, is performed more rarely, e.g. only when required.

Detecting devices, e.g. of the above disclosed kinds, may be arranged to detect whether a milking stall 19a is empty or whether an animal 15 in a milking stall 19a is not to be milked, or is not being milked, during a revolution of the rotating platform 19, wherein the controller 18 is arranged to control the cleaning arrangement 17 such that the cleaning according to the first cleaning scheme is performed while the milking stall 19a which has been detected as empty or housing an animal 15 detected as not to be, or not being, milked during the revolution of the rotating platform 19, passes by the robot 10 during that revolution of the rotating platform 19. Embodiments of this approach have been detailed above.

Alternatively, a usage identifying arrangement, e.g. of any of the above disclosed kinds, may be arranged to identify a future usage demand of the camera 14, wherein the controller 18 is arranged to analyse the future usage demand of the camera 14 to find at least one time slot wherein the camera 14 is not to be used and to control the cleaning arrangement 17 such that the cleaning according to the first cleaning scheme is performed during this time slot. Embodiments of this approach have been detailed above.

The controller 18 may further be arranged to control the rinsing arrangement 17a such that the cleaning according to the second cleaning scheme is performed between the animal related operations with respect to animals in each two adjacent milking stalls. If the cleaning according to the second cleaning scheme is performed sufficiently fast (i.e. during the time slot wherein the camera is not to be used normally occurring between the animal related operations with respect to animals in each two adjacent milking stalls), it may not affect the throughput or utilization of the rotary milking system at all. Alternatively, this cleaning only delays the milking operation to a minor extent.

It shall be appreciated that also this version of the invention may be practiced with any of the alternative features, details, and embodiments disclosed above. In particular, the lens arrangement may be cleaned according to the first cleaning scheme only if being dirty (as detected by the lens arrangement uncleanliness sensor), the robot may be a robot for attaching teat cups to the teats of the animals in the milking stalls prior to milking, a robot arranged to pre-treat, and/or clean, and/or foremilk the teats of the animals in the milking stalls prior to milking, or a robot arranged to post-treat the teats of the animals in the milking stalls subsequent to milking, and/or the robot/camera combination and the camera cleaning system with two different cleaning schemes may be provided in a plurality.

The present invention relates also to a rotary milking system including one or more robots, each for performing an animal related operation with respect to animals 15 in milking stalls 19a passing by the robot 10, and, for each robot 10, a camera 14 in response to signals from which the robot 10 is configured to move, and any of the camera cleaning systems disclosed above.

The invention relates as well as to camera cleaning methods using any of the camera cleaning systems disclosed above.

While the invention has been described above by way of example, it shall be understood that the same may be varied in several details. In particular, the various features and embodiments disclosed above may be combined in a number of further ways readily available to a person skilled in the art to thereby form yet further embodiments of the invention. Further, embodiments of the invention may only comprise some of the features disclosed above with reference to a particular embodiment. The objects and advantages of the present invention as disclosed herein are accomplished and obtained by each of the embodiments of the invention. The scope of the present patent is defined by the following claims.

The invention claimed is:

1. A camera cleaning system for a milking system, which milking system comprises a moving platform (19), a plurality of milking stalls (19a) arranged on the moving platform that house a plurality of animals (15) during milking thereof, a robot (10) that performs animal related operations with respect to the animals in the milking stalls passing by the robot, and a camera (14) that provides signals for movement of the robot, the camera having a lens arrangement, the camera cleaning system comprising:
 a usage identifying arrangement that identifies a future usage demand of the camera;
 a processing device (18) that, based on the identified future usage demand of the camera from the usage identifying arrangement, finds a first cleaning time slot of a first time period i) where the camera is not to be used, and ii) that occurs completely within another time period that occurs completely within at least one of the group consisting of:
  (i) a first condition of when an empty milking stall will pass by the robot while the animals are present in non-empty milking stalls of the moving platform,
  (ii) a second condition of when a non-empty milking stall that houses an animal which is not to be milked will pass by the robot during movement of the moving platform,
  (iii) a third condition of when a non-empty milking stall that houses an animal not being milked will pass by the robot during movement of the moving platform, and
  (iv) a fourth condition of when an unplanned stoppage of the milking system occurs; and
 a cleaning arrangement (17) that cleans the lens arrangement of the camera by performing a first cleaning operation during the found first cleaning time slot, the cleaning arrangement (17) operatively connected to the processing device (18) to receive the found first cleaning time slot,
 wherein the first time period is longer than a first cleaning time period required for the cleaning arrangement to perform the first cleaning operation on the lens arrangement of the camera.

2. The camera cleaning system of claim 1, wherein, the processing device (18), based on the identified future usage demand on the camera, finds a second cleaning time slot of a second time period where the camera is not to be used and that occurs completely within a time period between the animal related operations with respect to animals in each two adjacent milking stalls, the second time period is longer than a second cleaning time period required for the cleaning arrangement to perform a second cleaning operation on the lens arrangement of the camera, the second time period being shorter than the first time period; and
 the cleaning arrangement (17), upon direction of the processing device, cleans the lens arrangement of the camera by performing the second cleaning operation during said found second cleaning time slot.

3. The camera cleaning system of claim 1, wherein said processing device (18), in finding the first cleaning time slot, determines that the first cleaning time slot occurs completely within the other time period of at least one of the group consisting of
 (i) the first condition of when the empty milking stall will pass by the robot while the animals are present in the non-empty milking stalls of the moving platform, and
 (ii) the second condition of when the non-empty milking stall that houses the animal which is not to be milked will pass by the robot during movement of the moving platform.

4. The camera cleaning system of claim 3, wherein said processing device (18), in finding the first cleaning time slot, determines that said first milking time slot occurs completely within the other time period of the second condition of when the non-empty milking stall that houses the animal which is not to be milked will pass by the robot during movement of the moving platform.

5. The camera cleaning system of claim 3, wherein said processing device (18), in finding the first cleaning time slot, determines that said first milking time slot occurs completely within the other time period of the first condition of when the empty milking stall will pass by the robot while the animals are present in the non-empty milking stalls of the moving platform.

6. The camera cleaning system of claim 1, wherein said processing device (18), in finding the first cleaning time slot, determines that the first cleaning time slot occurs completely within the other time period of the third condition of when the non-empty milking stall that houses the animal not being milked will pass by the robot during movement of the moving platform.

7. The camera cleaning system of claim 1, wherein said processing device (18), in finding the first cleaning time slot, determines that the first cleaning time slot occurs completely within the other time period of the fourth condition of when the unplanned stoppage of the milking system occurs.

8. The camera cleaning system of claim 1, wherein,
 the milking system is a rotary milking system,
 the moving platform, on which the milking stalls are arranged, is a rotating platform,
 the usage identifying arrangement includes at least one of the group consisting of:
  i) the camera (14) that detects when the milking stall is empty, when the milking stall is not empty, and when the animal in the milking stall is not being milked,
  ii) a dedicated sensor (21) that detects when milking stall is empty and when the milking stall is not empty,
  iii) an animal identification device (22) that detects when the milking stall is empty, when the milking stall is not empty, and when the animal housed in the milking stall is the animal which is not permitted to be milked, and
  iv) for each of the milking stalls, vacuum sensing means or milk flow sensing means that sense the vacuum or the milk flow in each individual milking stall and thereby detects when that milking stall is empty or when the animal in that milking stall is not being milked, the cleaning arrangement (17) comprises a rinsing arrangement (17*a*), the cleaning arrangement (17) cleans the lens arrangement of the camera, during the first cleaning time slot, while one of the milking stalls passes by the robot during rotation of rotating platform according to the first cleaning operation, and the rinsing arrangement (17*a*) cleans the lens arrangement of the camera, during the second cleaning time slot, while the one of the milking stalls passes by the robot during rotation of rotating platform according to the second cleaning operation.

9. A method of camera cleaning for a milking system, which milking system comprises a moving platform (19), a plurality of milking stalls (19*a*) arranged on the moving platform that house a plurality of animals (15) during milking thereof, a robot (10) that performs animal related operations with respect to the animals in the milking stalls passing by the robot, and a camera (14) that provides signals for movement of the robot, the camera having a lens arrangement, the camera cleaning method comprising the steps of:

identifying, by a usage identifying arrangement, a future usage demand of the camera;

finding, by a processing device (18), based on the identified future usage demand of the camera from the usage identifying arrangement, a first cleaning time slot of a first time period i) where the camera is not to be used, and ii) that occurs completely within another time period that occurs completely within at least one of the group consisting of:

(i) a first condition of when an empty milking stall will pass by the robot while the animals are present in non-empty milking stalls of the moving platform, (ii) a second condition of when a non-empty milking stall that houses an animal which is not to be milked will pass by the robot during movement of the moving platform, (iii) a third condition of when a non-empty milking stall that houses an animal not being milked will pass by the robot during movement of the moving platform, and (iv) a fourth condition of when an unplanned stoppage of the milking system occurs; and cleaning, by a cleaning arrangement (17), the lens arrangement of the camera by performing a first cleaning operation during the found first cleaning time slot, the cleaning arrangement (17) operatively connected to the processing device (18) to receive the found first cleaning time slot, wherein the first time period is longer than a first cleaning time period required for the cleaning arrangement to perform the first cleaning operation on the lens arrangement of the camera.

10. The method of camera cleaning of claim 9, comprising the further step of:

the processing device (18), based on the analyzed future usage demand on the camera, finding a second cleaning time slot of a second time period where the camera is not to be used and that occurs completely within a time period between the animal related operations with respect to animals in each two adjacent milking stalls, wherein the second time period is longer than a second cleaning time period required for the cleaning arrangement to perform a second cleaning operation on the lens arrangement of the camera, the second time period being shorter than the first time period; and upon direction of the processing device, the cleaning arrangement (17) cleaning the lens arrangement of the camera by performing the second cleaning operation during said found second cleaning time slot.

11. The method of camera cleaning of claim 10, wherein, the cleaning arrangement (17) comprises a rinsing arrangement (17*a*), the cleaning arrangement (17) cleans the lens arrangement of the camera, during the first cleaning time slot, while one of the milking stalls passes by the robot during rotation of rotating platform according to the first cleaning operation, and the rinsing arrangement (17*a*) cleans the lens arrangement of the camera, during the second cleaning time slot, while the one of the milking stalls passes by the robot during rotation of rotating platform during the second cleaning time slot according to the second cleaning operation.

12. The method of camera cleaning of claim 9, wherein said processing device (18), in finding the first cleaning time slot, determines that the first cleaning time slot occurs completely within the other time period of at least one of the group consisting of (i) the first condition of when the empty milking stall will pass by the robot while the animals are present in the non-empty milking stalls of the moving platform, and (ii) the second condition of when the non-empty milking stall that houses the animal which is not to be milked will pass by the robot during movement of the moving platform.

13. The method of camera cleaning of claim 12, wherein said processing device (18), in finding the first cleaning time slot, determines that said first milking time slot occurs completely within the other time period of the second condition of when the non-empty milking stall that houses the animal which is not to be milked will pass by the robot during movement of the moving platform.

14. The method of camera cleaning of claim 12, wherein said processing device (18), in finding the first cleaning time slot, determines that said first milking time slot occurs completely within the other time period of the first condition of when the empty milking stall will pass by the robot while the animals are present in the non-empty milking stalls of the moving platform.

15. The method of camera cleaning of claim 9, wherein said processing device (18), in finding the first cleaning time slot, determines that the first cleaning time slot occurs completely within the other time period of the third condition of when the non-empty milking stall that houses the animal not being milked will pass by the robot during movement of the moving platform.

16. The method of camera cleaning of claim 9, wherein said processing device (18), in finding the first cleaning time slot, determines that the first cleaning time slot occurs completely within the other time period of the fourth condition of when the unplanned stoppage of the milking system occurs.

17. The method of camera cleaning of claim 9, wherein, the milking system is a rotary milking system, the moving platform (19) is a rotating platform, and the usage identifying arrangement comprises a camera arranged on an arm of the robot.

18. The method of camera cleaning of claim 17, wherein the cleaning arrangement is located remote from the camera, and the method comprising the further step of the robot moving the camera to the cleaning arrangement when the cleaning arrangement cleans the lens arrangement of the camera.

19. The method of camera cleaning of claim 9, wherein the robot pre-treats, or cleans, or foremilks the teats of the animals in each of the milking stalls prior to milking.

20. The method of camera cleaning of claim 9, wherein the robot post-treats the teats of the animals in each of the milking stalls subsequent to milking.

\* \* \* \* \*